US010243824B2

(12) United States Patent
Zalmanovitch et al.

(10) Patent No.: US 10,243,824 B2
(45) Date of Patent: *Mar. 26, 2019

(54) ON-DEVICE ATTRIBUTION OF NETWORK DATA USAGE

(71) Applicant: Microsoft Technology Licensing, LLC, Redmond, WA (US)

(72) Inventors: Gil Zalmanovitch, Seattle, WA (US); Gregory James Scott, Seattle, WA (US); Shai Guday, Redmond, WA (US); Alec Garvin Kwok, Redmond, WA (US); Yue Jiang, Redmond, WA (US); Kenneth Vincent Ma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,791

(22) Filed: Jun. 12, 2017

(65) Prior Publication Data

US 2017/0279699 A1 Sep. 28, 2017

Related U.S. Application Data

(63) Continuation of application No. 14/988,462, filed on Jan. 5, 2016, now Pat. No. 9,825,830, which is a (Continued)

(51) Int. Cl.
*H04L 12/26* (2006.01)
*H04M 15/00* (2006.01)
(Continued)

(52) U.S. Cl.
CPC ...... *H04L 43/0876* (2013.01); *H04L 12/1435* (2013.01); *H04L 43/045* (2013.01);
(Continued)

(58) Field of Classification Search
CPC ........ H04W 24/02; H04W 4/26; H04W 8/18; H04M 15/856; H04M 15/58; H04M 15/83;
(Continued)

(56) References Cited

U.S. PATENT DOCUMENTS 5,778,182 A * 7/1998 Cathey ................... H04N 7/165
348/E7.063
6,308,328 B1 10/2001 Bowcutt et al.
(Continued)

FOREIGN PATENT DOCUMENTS

CN 1317745 A 10/2001
CN 101150496 A 3/2008
(Continued)

OTHER PUBLICATIONS

"Supplementary Search Report Issued in European Patent Application No. 13741434.8", dated Sep. 30, 2014, 3 Pages.
(Continued)

*Primary Examiner* — Tu Nguyen

(57) ABSTRACT

Embodiments attribute network data transfers to applications executing on a computing device. A data transfer service executes on the computing device to receive and process data transfer requests. The data transfer requests, populated by the applications, have identifiers attributed thereto to enable monitoring of the network data transfers per identifier. For example, network data transfers associated with different mail accounts of a mail program or different web sites of browser are attributed separately. Data usage statistics relating to the network data transfers for each identifier may be generated and presented to the user for review.

20 Claims, 6 Drawing Sheets

Related U.S. Application Data continuation of application No. 13/721,083, filed on Dec. 20, 2012, now Pat. No. 9,264,556.

(60) Provisional application No. 61/696,472, filed on Sep. 4, 2012, provisional application No. 61/591,503, filed on Jan. 27, 2012, provisional application No. 61/591,509, filed on Jan. 27, 2012.

(51) Int. Cl.
| | |
|---|---|
| *H04W 4/60* | (2018.01) |
| *H04L 12/14* | (2006.01) |
| *H04W 4/24* | (2018.01) |
| *H04W 4/00* | (2018.01) |
| *H04W 8/18* | (2009.01) |
| *H04M 1/725* | (2006.01) |
| *H04W 88/06* | (2009.01) |

(52) U.S. Cl.
CPC .......... *H04L 43/062* (2013.01); *H04M 15/41* (2013.01); *H04M 15/58* (2013.01); *H04M 15/60* (2013.01); *H04M 15/765* (2013.01); *H04M 15/7652* (2013.01); *H04M 15/80* (2013.01); *H04M 15/83* (2013.01); *H04M 15/84* (2013.01); *H04M 15/846* (2013.01); *H04M 15/85* (2013.01); *H04M 15/853* (2013.01); *H04M 15/854* (2013.01); *H04M 15/86* (2013.01); *H04W 4/003* (2013.01); *H04W 4/24* (2013.01); *H04W 4/60* (2018.02); *H04W 8/186* (2013.01); *H04M 1/72522* (2013.01); *H04M 15/775* (2013.01); *H04M 15/8044* (2013.01); *H04M 15/856* (2013.01); *H04W 8/18* (2013.01); *H04W 88/06* (2013.01)

(58) Field of Classification Search
CPC .... H04M 15/84; H04M 15/85; H04M 15/846; H04L 43/045; H04L 43/0876; H04L 12/1435; H04L 43/04
USPC ........................................................ 709/224
See application file for complete search history.

(56) References Cited

U.S. PATENT DOCUMENTS

| | | | |
|---|---|---|---|
| 7,103,740 B1 | 9/2006 | Colgrove et al. | |
| 7,184,749 B2 | 2/2007 | Marsh et al. | |
| 7,277,938 B2 | 10/2007 | Duimovich et al. | |
| 7,320,131 B1 | 1/2008 | O'Toole, Jr. | |
| 7,406,596 B2 | 7/2008 | Tararukhina et al. | |
| 7,418,532 B2 | 8/2008 | Suzuki et al. | |
| 7,532,571 B1 | 5/2009 | Price et al. | |
| 7,720,727 B2 | 5/2010 | Keyes et al. | |
| 7,904,080 B2 | 3/2011 | Atkins et al. | |
| 7,986,935 B1 | 7/2011 | D'Souza et al. | |
| 8,064,876 B2 | 11/2011 | Knight | |
| 8,160,598 B2 | 4/2012 | Savoor | |
| 8,255,731 B1 | 8/2012 | Alsina et al. | |
| 8,285,250 B2 | 10/2012 | Rubin et al. | |
| 8,359,389 B1 | 1/2013 | Cohen et al. | |
| 8,374,576 B2 | 2/2013 | Bedingfield, Sr. et al. | |
| 8,407,721 B2 | 3/2013 | Dyba et al. | |
| 8,484,568 B2 | 7/2013 | Rados et al. | |
| 8,542,661 B2 | 9/2013 | Moeller et al. | |
| 8,572,256 B2 | 10/2013 | Babbar | |
| 8,650,325 B2 | 2/2014 | Sharkey | |
| 8,689,541 B2 | 4/2014 | McDonald et al. | |
| 8,880,022 B2 | 11/2014 | Agarwal et al. | |
| 8,924,352 B1 | 12/2014 | Andruss et al. | |
| 8,977,231 B2 | 3/2015 | Zalmanovitch et al. | |
| 9,049,589 B2 | 6/2015 | Zalmanovitch et al. | |
| 9,154,550 B1 | 10/2015 | Abgrall et al. | |
| 9,160,790 B1 | 10/2015 | Abgrall et al. | |
| 9,161,200 B2 | 10/2015 | Guday et al. | |
| 9,544,195 B1 | 1/2017 | Garg | |
| 9,544,212 B2 | 1/2017 | Zalmanovitch et al. | |
| 9,660,889 B2 | 5/2017 | Zalmanovitch et al. | |
| 9,838,287 B2 | 12/2017 | Zalmanovitch et al. | |
| 9,887,894 B2 | 2/2018 | Zalmanovitch et al. | |
| 9,900,231 B2 | 2/2018 | Zalmanovitch et al. | |
| 2002/0029273 A1 | 3/2002 | Haroldson et al. | |
| 2002/0082991 A1 | 6/2002 | Friedman et al. | |
| 2002/0090926 A1 | 7/2002 | Pirkola et al. | |
| 2003/0066055 A1 | 4/2003 | Spivey | |
| 2003/0115385 A1 | 6/2003 | Adamane et al. | |
| 2003/0181242 A1 | 9/2003 | Lee et al. | |
| 2003/0186706 A1 | 10/2003 | Bergins et al. | |
| 2004/0032828 A1 | 2/2004 | Satt et al. | |
| 2004/0040021 A1 | 2/2004 | Bharati et al. | |
| 2004/0111712 A1 | 6/2004 | Humpert et al. | |
| 2004/0153587 A1 | 8/2004 | Choi | |
| 2004/0176965 A1 | 9/2004 | Winch et al. | |
| 2004/0199634 A1 | 10/2004 | Jackowski et al. | |
| 2005/0052992 A1 | 3/2005 | Cloonan et al. | |
| 2005/0238047 A1 | 10/2005 | Holland et al. | |
| 2006/0075467 A1 | 4/2006 | Sanda et al. | |
| 2006/0141983 A1 | 6/2006 | Jagannathan et al. | |
| 2006/0211404 A1 | 9/2006 | Cromp et al. | |
| 2006/0277224 A1 | 12/2006 | Aftab et al. | |
| 2007/0060097 A1 | 3/2007 | Edge et al. | |
| 2007/0211674 A1 | 9/2007 | Ragnar Karlberg et al. | |
| 2007/0294562 A1 | 12/2007 | Takamatsu et al. | |
| 2008/0168245 A1 | 7/2008 | De Atley et al. | |
| 2008/0250083 A1 | 10/2008 | Kovacs et al. | |
| 2008/0311912 A1 | 12/2008 | Balasubramanian et al. | |
| 2008/0318621 A1 | 12/2008 | Fan et al. | |
| 2009/0054030 A1 | 2/2009 | Golds | |
| 2009/0068980 A1 | 3/2009 | Creswell et al. | |
| 2009/0068984 A1 | 3/2009 | Burnett | |
| 2009/0081996 A1* | 3/2009 | Duggal | H04L 12/1485 455/414.1 |
| 2009/0138427 A1 | 5/2009 | Kalavade | |
| 2009/0172275 A1 | 7/2009 | Nochimowski et al. | |
| 2009/0196302 A1 | 8/2009 | Pastorino et al. | |
| 2009/0199196 A1 | 8/2009 | Peracha | |
| 2009/0203352 A1 | 8/2009 | Fordon et al. | |
| 2009/0285201 A1 | 11/2009 | Ben-Haim et al. | |
| 2010/0015926 A1 | 1/2010 | Luff | |
| 2010/0017506 A1 | 1/2010 | Fadell | |
| 2010/0035576 A1 | 2/2010 | Jones et al. | |
| 2010/0130163 A1 | 5/2010 | Pousti | |
| 2010/0141009 A1 | 6/2010 | Kirch et al. | |
| 2010/0159948 A1 | 6/2010 | Spivey et al. | |
| 2010/0180190 A1 | 7/2010 | Carroll | |
| 2010/0184440 A1 | 7/2010 | Mao et al. | |
| 2010/0191612 A1 | 7/2010 | Raleigh | |
| 2010/0318647 A1 | 12/2010 | Savoor et al. | |
| 2011/0019566 A1 | 1/2011 | Leemet et al. | |
| 2011/0047620 A1 | 2/2011 | Mahaffey et al. | |
| 2011/0070898 A1 | 3/2011 | Sanjeev et al. | |
| 2011/0087985 A1 | 4/2011 | Buchanan et al. | |
| 2011/0137776 A1 | 6/2011 | Goad et al. | |
| 2011/0145920 A1 | 6/2011 | Mahaffey et al. | |
| 2011/0151831 A1 | 6/2011 | Pattabiraman | |
| 2011/0176482 A1 | 7/2011 | Vizor et al. | |
| 2011/0208857 A1 | 8/2011 | Gentile et al. | |
| 2011/0211465 A1 | 9/2011 | Farrugia et al. | |
| 2011/0231551 A1 | 9/2011 | Hassan et al. | |
| 2011/0238826 A1 | 9/2011 | Carre et al. | |
| 2011/0244826 A1 | 10/2011 | Krishnan et al. | |
| 2011/0275344 A1* | 11/2011 | Momtahan | H04L 12/14 455/405 |
| 2011/0276442 A1 | 11/2011 | Momtahan et al. | |
| 2011/0276823 A1 | 11/2011 | Ueno et al. | |
| 2011/0300865 A1 | 12/2011 | Kashikar et al. | |
| 2012/0023189 A1 | 1/2012 | Giaretta et al. | |
| 2012/0054661 A1 | 3/2012 | Rados et al. | |
| 2012/0064908 A1 | 3/2012 | Fox et al. | |
| 2012/0064923 A1 | 3/2012 | Imes et al. | |
| 2012/0072481 A1* | 3/2012 | Nandlall | G06F 9/5027 709/203 |
| 2012/0101952 A1 | 4/2012 | Raleigh et al. | |

(56) References Cited

U.S. PATENT DOCUMENTS

| | | |
|---|---|---|
| 2012/0108200 A1 | 5/2012 | Rubin et al. |
| 2012/0117478 A1 | 5/2012 | Vadde et al. |
| 2012/0142310 A1 | 6/2012 | Pugh et al. |
| 2012/0150808 A1 | 6/2012 | Hubner et al. |
| 2012/0155296 A1 | 6/2012 | Kashanian |
| 2012/0158947 A1 | 6/2012 | Hassan et al. |
| 2012/0163232 A1 | 6/2012 | Yoo |
| 2012/0198046 A1 | 8/2012 | Shah et al. |
| 2012/0208495 A1 | 8/2012 | Lawson et al. |
| 2012/0215911 A1 | 8/2012 | Raleigh et al. |
| 2012/0278194 A1 | 11/2012 | Dewan et al. |
| 2012/0290584 A1 | 11/2012 | De Bona et al. |
| 2012/0303823 A1 | 11/2012 | Nair et al. |
| 2012/0311176 A1 | 12/2012 | Dellinger et al. |
| 2012/0315872 A1 | 12/2012 | Amato et al. |
| 2013/0023230 A9 | 1/2013 | Momtahan et al. |
| 2013/0028143 A1 | 1/2013 | Vasseur et al. |
| 2013/0035059 A1 | 2/2013 | Liu et al. |
| 2013/0054378 A1 | 2/2013 | Hao et al. |
| 2013/0060653 A1 | 3/2013 | Sharkey |
| 2013/0064106 A1 | 3/2013 | Sylvain |
| 2013/0115940 A1 | 5/2013 | Zhou et al. |
| 2013/0117846 A1 | 5/2013 | Mahaffey et al. |
| 2013/0122882 A1 | 5/2013 | Patel et al. |
| 2013/0136067 A1 | 5/2013 | Praveenkumar et al. |
| 2013/0149994 A1 | 6/2013 | Gaddam et al. |
| 2013/0185292 A1 | 7/2013 | Li et al. |
| 2013/0196615 A1 | 8/2013 | Zalmanovitch et al. |
| 2013/0196616 A1 | 8/2013 | Zalmanovitch et al. |
| 2013/0196617 A1 | 8/2013 | Zalmanovitch et al. |
| 2013/0196618 A1 | 8/2013 | Zalmanovitch et al. |
| 2013/0196621 A1 | 8/2013 | Guday et al. |
| 2013/0196626 A1 | 8/2013 | Zalmanovitch et al. |
| 2013/0198373 A1 | 8/2013 | Zalmanovitch et al. |
| 2013/0297965 A1 | 11/2013 | Mensah |
| 2014/0044099 A1 | 2/2014 | Sfar |
| 2014/0248852 A1 | 9/2014 | Raleigh et al. |
| 2014/0301218 A1 | 10/2014 | Luo et al. |
| 2015/0181047 A1 | 6/2015 | Zalmanovitch et al. |
| 2016/0112577 A1 | 4/2016 | Guday et al. |
| 2017/0086053 A1 | 3/2017 | Zalmanovitch et al. |
| 2017/0187596 A1 | 6/2017 | Zalmanovitch et al. |
| 2017/0373959 A1 | 12/2017 | Zalmanovitch et al. |
| 2018/0097643 A1 | 4/2018 | Raleigh et al. |

FOREIGN PATENT DOCUMENTS

| | | |
|---|---|---|
| CN | 101401391 A | 4/2009 |
| CN | 101553797 A | 10/2009 |
| CN | 101895967 A | 11/2010 |
| JP | 1011344 A | 1/1998 |
| JP | 2003102066 A | 4/2003 |
| JP | 2003299150 A | 10/2003 |
| JP | 2003338856 A | 11/2003 |
| JP | 2004072590 A | 3/2004 |
| JP | 2004140684 A | 5/2004 |
| JP | 2005168041 A | 6/2005 |
| JP | 2005198021 A | 7/2005 |
| JP | 2009230575 A | 10/2009 |
| JP | 2010103892 A | 5/2010 |
| JP | 2010531565 A | 9/2010 |
| JP | 2011124617 A | 6/2011 |
| JP | 2012138709 A | 7/2012 |
| JP | 2013534081 A | 8/2013 |
| JP | 2014502066 A | 1/2014 |
| JP | 2015519781 A | 7/2015 |
| WO | 2006004784 A1 | 1/2006 |
| WO | 2008097105 A1 | 8/2008 |
| WO | 2008155444 A1 | 12/2008 |
| WO | 2011139923 A2 | 11/2011 |
| WO | 2012083285 A2 | 6/2012 |
| WO | 2012162419 A2 | 11/2012 |
| WO | 2013033702 A1 | 3/2013 |

OTHER PUBLICATIONS

"Notice of Allowance Issued in European Patent Application No. 13741633.5", dated Aug. 6, 2015, 5 Pages.

"Office Action Issued in European Patent Application No. 13741633.5", dated Nov. 27, 2014, 7 Pages.

"Supplementary Search Report Issued in European Patent Application No. 13741633.5", dated Sep. 18, 2014, 3 Pages.

"Final Office Action Issued in U.S. Appl. No. 14/642,378", dated Oct. 19, 2015, 13 Pages.

"Non-Final Office Action Issued in U.S. Appl. No. 14/642,378", dated Jun. 12, 2015, 12 Pages.

"Non-Final Office Action Issued in U.S. Appl. No. 14/642,378", dated Mar. 2, 2016, 10 Pages.

"Notice of Allowance Issued in U.S. Appl. No. 14/642,378", dated Aug. 4, 2016, 7 Pages.

"Notice of Allowance Issued in U.S. Appl. No. 14/642,378", dated Sep. 26, 2016, 7 Pages.

"Notice of Allowance Issued in U.S. Appl. No. 14/642,378", dated Jan. 17, 2017, 7 Pages.

"Final Office Action Issued in U.S. Appl. No. 14/835,693", dated May 6, 2016, 16 Pages.

"Non-Final Office Action Issued in U.S. Appl. No. 14/835,693", dated Feb. 3, 2016, 14 Pages.

"Non-Final Office Action Issued in U.S. Appl. No. 14/835,693", dated Aug. 26, 2016, 15 Pages.

"Non-Final Office Action Issued in U.S. Appl. No. 14/839,243", dated Jun. 16, 2016, 16 Pages.

"Final Office Action Issued in U.S. Appl. No. 14/988,462", dated Jun. 23, 2017, 11 Pages.

"Non-Final Office Action Issued in U.S. Appl. No. 14/988,462", dated Dec. 16, 2016, 10 Pages.

"Non Final Office Action Issued in U.S. Appl. No. 15/350,001", dated Jun. 14, 2017, 8 Pages.

"Office Action Issued in China Patent Application No. 201380057427.9", dated Aug. 2, 2017, 15 Pages.

"Office Action Issued in Australian Patent Application No. 2013212632", dated Jun. 12, 2017, 3 Pages.

"First Office Action and Search Report Issued in Chinese Patent Application No. 201380006806.5", dated Dec. 1, 2015, 15 Pages.

"Notice of Allowance Issued in Chinese Patent Application No. 201380006806.5", dated Mar. 1, 2017, 4 Pages.

"Second Office Action Issued in Chinese Patent Application No. 201380006806.5", dated Aug. 12, 2016, 7 Pages.

"First Office Action and Search Report Issued in Chinese Patent Application No. 201380006974.4", dated Nov. 30, 2016, 16 Pages.

"Office Action Issued in Chinese Application No. 201380006974.4", dated Apr. 14, 2017, 18 Pages.

"Office Action Issued in Chinese Patent Application No. 201380057427.9", dated Jan. 3, 2016, 15 pages.

"Notice of Allowance Issued in Russian Patent Application No. 2014131055", dated Nov. 24, 2016, 16 Pages.

"Office Action Issued in Russian Patent Application No. 2014131055", dated Aug. 18, 2016, 5 Pages.

"Notice of Allowance Issued in Japanese Patent Application No. 2014-554756", dated Jul. 11, 2017, 3 Pages.

"Office Action Issued in Japanese Patent Application No. 2014-554756", dated Nov. 22, 2016, 5 Pages.

"Office Action Issued in Japanese Patent Application No. 2014-554805", dated Feb. 14, 2017, 9 Pages.

"Office Action Issued in Japanese Patent Application No. 2014-554805", dated Jul. 19, 2016, 12 Pages.

Balasubramanian, Aruna, "Architecting Protocols to Enable Mobile Applications in Diverse Wireless Networks", A Dissertation Submitted to the Graduate School of the University of Massachusetts Amherst in Partial Fulfillment of the Requirements for the Degree of Doctor of Philosophy, Feb. 1, 2011, 198 Pages.

Blass, Evan, "Exclusive: Windows Phone 8 Detailed", Retrieved from <<http://pocketnow.com/windows-phone/exclusive-windows-phone-8-detailed>>, Feb. 2, 2012, 2 Pages.

(56) References Cited

OTHER PUBLICATIONS

Heikkinen, et al., "Measuring Mobile Peer-to-Peer Usage: Case Finland 2007", In Proceedings of the 10th International Conference on Passive and Active Network Measurement, Apr. 28, 2009, pp. 165-174.
Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.
MX/A/2014/008566, "Notice of Allowance Issued in Mexican Patent Application No. MX/a/2014/008566", dated Sep. 23, 2016, 2 Pages.
"International Preliminary Report on Patentability Issued in PCT Application No. PCT/US2013/022822", dated Aug. 7, 2014, 6 Pages.
"International Search Report & Written Opinion Issued in PCT Patent Application No. PCT/US2013/022822", dated Apr. 25, 2013, 9 Pages.
"International Preliminary Report on Patentability Issued in PCT Application No. PCT/US2013/022353", dated Aug. 7, 2014, 7 Pages.
"International Search Report & Written Opinion Issued in PCT Application No. PCT/US2013/022353", dated May 15, 2013, 10 Pages.
"Notice of Allowance Issued in Japan Patent Application No. 2015-529965", dated Jul. 25, 2017, 3 Pages.
"International Search Report & Written Opinion Issued in PCT Application No. PCT/US2013/056923", dated Jan. 7, 2014, 11 Pages.
Peddemors, Arjan, "Network Resource Awareness and Prediction on Mobile Devices", In Novay PhD Research Series, No. 026 (Novay/PRS/026), Oct. 20, 2009, 236 Pages.
Pluta, et al., "Who Moved My Data? A Backup Tracking System for Dynamic Workstation Environments", In Proceedings of LISA '04: Eighteenth Systems Administration Conference, Nov. 14, 2004, 10 Pages.
Rhee, Ed, "How to Track Data Usage on your Android Phone", Retrieved from <<http://www.cnet.com/how-to/how-to-track-data-usage-on-your-android-phone/>>, Jul. 8, 2011, 4 Pages.
Sinofsky, Steven, "Engineering Windows 8 for Mobile Networks", Retrieved from <<https://blogs.msdn.microsoft.com/b8/2012/01/20/engineering-windows-8-for-mobile-networks/>>, Jan. 20, 2012, 28 Pages.
Unuth, Nadeem, "Data Usage Monitor Apps for Your iPhone and iPad", Retrieved from <<http://voip.about.com/od/voipbandwidth/tp/Data-Usage-Monitor-Apps-For-Your-Iphone-And-Ipad.htm>>, Retrieved Date: Oct. 8, 2012, 1 Page.
"DataMan Pro for iPad—Analyze your 3G Data Usage on Your Computer", Retrieved from >>http://prmac.com/release-d-27794.htm>>, Jul. 9, 2011, 2 Pages.
"Mobile Data Usage Meter—Manage Mobile Data Usage & Wireless Broadband Devices", Retrieved from <<http://web.archive.org/web/20091228092436/http://www.telstrabusiness.com/business/portal/online/site/myaccount/mobiledatausagemeter.94003>>, Jan. 28, 2015, 2 Pages.
"My Data Usage Pro", Retrieved from <<http://download.cnet.com/My-Data-Usage-Pro/3000-2094_4-75402502.html>>, Retrieved Date: Dec. 12, 2014, 3 Pages.
"Rapid Mobile Data Service Creation and Monetization", Retrieved from <<http://qpass.net/Products/network-control/Documents/data-experience-solution-datasheet.pdf>>, Oct. 2, 2012, 7 Pages.
"Office Action and Search Report Issued in Taiwanese Patent Application No. 102101668", dated Dec. 14, 2016, 10 pages.
"Final Office Action in U.S. Appl. No. 13/721,023", dated Oct. 27, 2014, 16 Pages.
"Final Office Action Issued in U.S. Appl. No. 13/721,023", dated Oct. 5, 2015, 26 Pages.
"Non-Final Office Action Issued in U.S. Appl. No. 13/721,023", dated Mar. 28, 2014, 16 Pages.

"Non-Final Office Action Issued in U.S. Appl. No. 13/721,023", dated Feb. 13, 2015, 19 Pages.
"Non-Final Office Action Issued in U.S. Appl. No. 13/721,023", dated Jun. 16, 2016, 23 Pages.
"Final Office Action Issued in U.S. Appl. No. 13/721,029", dated Oct. 1, 2014, 19 Pages.
"Non-Final Office Action Issued in U.S. Appl. No. 13/721,029", dated Mar. 17, 2015, 25 Pages.
"Non-Final Office Action Issued in U.S. Appl. No. 13/721,029", dated Feb. 18, 2016, 33 Pages.
"Non-Final Office Action Issued in U.S. Appl. No. 13/721,029", dated Mar. 11, 2014, 14 Pages.
"Notice of Allowance Issued in U.S. Appl. No. 13/721,029", dated Aug. 30, 2016, 9 Pages.
"Office Action Issued in European Patent Application No. 13741434.8", dated Nov. 27, 2014, 6 Pages.
"Non-Final Office Action Issued in U.S. Appl. No. 13/721,032", dated Aug. 5, 2014, 16 Pages.
"Non-Final Office Action Issued in U.S. Appl. No. 13/721,032", dated Feb. 6, 2014, 11 Pages.
"Notice of Allowance Issued in U.S. Appl. No. 13/721,032", dated Jan. 30, 2015, 13 Pages.
"Final Office Action Issued in U.S. Appl. No. 13/721,041", dated Sep. 14, 2015, 24 Pages.
"Non-Final Office Action Issued in U.S. Appl. No. 13/721,041", dated Mar. 28, 2014, 15 Pages.
"Non-Final Office Action Issued in U.S. Appl. No. 13/721,041", dated Apr. 8, 2016, 24 Pages.
"Non-Final Office Action Issued in U.S. Appl. No. 13/721,041", dated Jan. 7, 2015, 21 Pages.
"Applicant Initialed Interview Summary Issued in U.S. Appl. No. 13/721,053", dated May 30, 2014, 3 Pages.
"Examiner Initialed Interview Summary Issued in U.S. Appl. No. 13/721,053", dated Aug. 19, 2014, 2 Pages.
"Non-Final Office Action Issued in U.S. Appl. No. 13/721,053", dated Mar. 18, 2014, 8 Pages.
"Notice of Allowance Issued in U.S. Appl. No. 13/721,053", dated Oct. 28, 2014, 7 Pages.
"Notice of Allowance Issued in U.S. Appl. No. 13/721,053", dated Aug. 19, 2014, 14 Pages.
"Final Office Action Issued in U.S. Appl. No. 13/721,057", dated Sep. 30, 2015, 36 Pages.
"Final Office Action Issued in U.S. Appl. No. 13/721,057", dated Jul. 15, 2016, 31 Pages.
"Non-Final Office Action Issued in U.S. Appl. No. 13/721,057", dated Feb. 25, 2016, 28 Pages.
"Non-Final Office Action Issued in U.S. Appl. No. 13/721,057", dated Mar. 27, 2015, 30 Pages.
"Final Office Action Issued in U.S. Appl. No. 13/721,058", dated Sep. 22, 2014, 15 Pages.
"Non-Final Office Action Issued in U.S. Appl. No. 13/721,058", dated Apr. 16, 2014, 11 Pages.
"Non-Final Office Action Issued in U.S. Appl. No. 13/721,058", dated Jan. 22, 2015, 13 Pages.
"Notice of Allowance Issued in U.S. Appl. No. 13/721,058", dated May 8, 2015, 7 Pages.
"Notice of Allowance Issued in U.S. Appl. No. 13/721,058", dated Sep. 14, 2015, 3 Pages.
"Final Office Action Issued in U.S. Appl. No. 13/721,066", dated Oct. 15, 2015, 20 Pages.
"Non-Final Office Action Issued in U.S. Appl. No. 13/721,066", dated Mar. 23, 2016, 27 Pages.
"Non-Final Office Action Issued in U.S. Appl. No. 13/721,066", dated Feb. 13, 2015, 17 Pages.
"Final Office Action Issued in U.S. Appl. No. 13/721,069", dated Nov. 28, 2014, 23 Pages.
"Non-Final Office Action Issued in U.S. Appl. No. 13/721,069", dated Jul. 7, 2015, 27 Pages.
"Non-Final Office Action Issued in U.S. Appl. No. 13/721,069", dated Mar. 14, 2014, 15 Pages.
"Notice of Allowance Issued in U.S. Appl. No. 13/721,069", dated Feb. 17, 2016, 12 Pages.

(56) References Cited

OTHER PUBLICATIONS

"Non-Final Office Action Issued in U.S. Appl. No. 13/721,083", dated Jun. 5, 2015, 10 Pages.
"Notice of Allowance Issued in U.S. Appl. No. 13/721,083", dated Oct. 5, 2015, 8 Pages.
"Office Action Issued in European Patent Application No. 13741434.8", dated Jul. 19, 2016, 15 Pages.
"Office Action Issued in European Patent Application No. 13741434.8", dated Oct. 26, 2015, 13 Pages.
"Notice of Allowance Issued in Taiwan Patent Application No. 102101668", dated Aug. 14, 2017, 4 Pages.
"Notice of Allowance Issued in Australian Patent Application No. 2013212632", dated Jul. 20, 2017, 3 Pages.
"Office Action and Search Report Issued in Taiwanese Patent Application No. 102102234", dated Aug. 21, 2017, 10 Pages.
"Final Office Action Issued in U.S. Appl. No. 13/721,023", dated May 4, 2017, 13 Pages.
"Final Office Action Issued in U.S. Appl. No. 13/721,041", dated Mar. 15, 2017, 22 Pages.
"Final Office Action Issued in U.S. Appl. No. 12/078,132", dated Nov. 14, 2016, 23 Pages.
"Final Office Action Issued in U.S. Appl. No. 14/835,693", dated Apr. 5, 2018, 14 Pages.
"Final Office Action Issued in U.S. Appl. No. 14/835,693", dated May 16, 2017, 16 Pages.
"Non-Final Office Action Issued in U.S. Appl. No. 14/835,693", dated Oct. 27, 2017, 14 Pages.
"Non-Final Office Action Issued in U.S. Appl. No. 14/835,693", dated Dec. 12, 2016, 15 Pages.
"Final Office Action Issued in U.S. Appl. No. 14/839,243", dated May 5, 2017, 11 Pages.
"Final Office Action Issued in U.S. Appl. No. 15/350,001", dated Dec. 7, 2017, 9 Pages.
"Non-Final Office Action Issued in U.S. Appl. No. 15/350,001", dated Apr. 23, 2018, 8 Pages.
"Non Final Office Action Issued in U.S. Appl. No. 15/365,919", dated Oct. 25, 2017, 26 Pages.
"Final Office Action Issued in U.S. Appl. No. 15/589,994", dated Apr. 5, 2018, 15 Pages.
"Non-Final Office Action Issued in U.S. Appl. No. 15/589,994", dated Oct. 24, 2017, 15 Pages.
"Third Office Action Issued in Chinese Patent Application No. 201380006974.4", dated Sep. 18, 2017, 13 Pages.
"Final Office Action Issued in U.S. Appl. No. 15/350,001", dated Sep. 13, 2018, 9 Pages.
"Non Final Office Action Issued in U.S. Appl. No. 15/876,094", dated Sep. 7, 2018, 31 Pages.
"Non Final Office Action Issued in U.S. Appl. No. 15/350,001", dated Jan. 14, 2018, 8 Pages.
"Office Action Issued in Canadian Patent Application No. 2,863,455", dated Nov. 8, 2018, 4 Pages.

* cited by examiner

ON-DEVICE ATTRIBUTION OF NETWORK DATA USAGE

CROSS-REFERENCE TO RELATED APPLICATIONS

This application is a continuation of U.S. application Ser. No. 14/988,462, filed on Jan. 5, 2016, which is a continuation of U.S. application Ser. No. 13/721,083, filed on Dec. 20, 2012, which claims the benefit of U.S. Provisional Application No. 61/696,472, filed Sep. 4, 2012, U.S. Provisional Application No. 61/591,503, filed Jan. 27, 2012, and U.S. Provisional Application No. 61/591,509, filed Jan. 27, 2012. The entireties of these applications are hereby incorporated by reference herein.

This application is related to the following applications: U.S. Patent Application entitled "Tracking Data Usage Under a Schematized Data Usage Plan," U.S. Patent Application entitled "Managing Data Transfers Over Network Connections Based on Priority and a Data Usage Plan," U.S. Patent Application entitled "Predicting Network Data Consumption Relative to Data Usage Patterns," U.S. Patent Application entitled "Updating Dynamic Data Usage Plans and Statistics," U.S. Patent Application entitled "Data Usage Profiles for Users and Applications," U.S. Patent Application entitled "Recommendations for Reducing Data Consumption Based on Data Usage Profiles," U.S. Patent Application entitled "Dynamically Adjusting a Data Usage Plan Based on Data Usage Statistics," and U.S. Patent Application entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering simple unlimited mobile data plans to offering capped and metered plans. Some of these capped and metered plans are complex, with allotted data caps varying based on network type, time of day, etc. Further, the fees for exceeding the allotted data caps may be significant and may also vary based on network type, time of day, etc. The existing systems generally lack mechanisms to help the user understand and manage network data consumption and transfer costs in view of the data usage plans.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can impact the user experience, leading to dissatisfied customers, increased customer service calls, and negative impressions of the mobile operators.

Some of the existing systems are focused on measuring network data consumption at content providers. However, server-based tracking such as by web site address in some of the existing systems fails to identify which particular application originated the request, at least because multiple applications on a device can access the same web site address. For example, some of the existing systems are not suitable for environments in which applications on a device queue data traffic with a centralized service executing on the device. In such environments, the identity of the originating application is not maintained and hence the network data usage is mis-attributed to the centralized service (rather than being attributed to the originating application). Such attribution is meaningless to the user trying to evaluate the amount of network data consumed by each application.

SUMMARY

Embodiments of the disclosure provide a data transfer service that enables attribution of data transfer requests to identifiers associated with applications originating the data transfer requests. The data transfer service executes on a computing device and receives data transfer requests from a plurality of applications executing on the computing device. Each of the data transfer requests has attributed thereto an identifier associated with origination of the data transfer request. The received data transfer requests are added to a queue. The data transfer service processes the queue to perform the data transfer requests. Data usage statistics are generated per identifier based on the performed data transfer requests.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
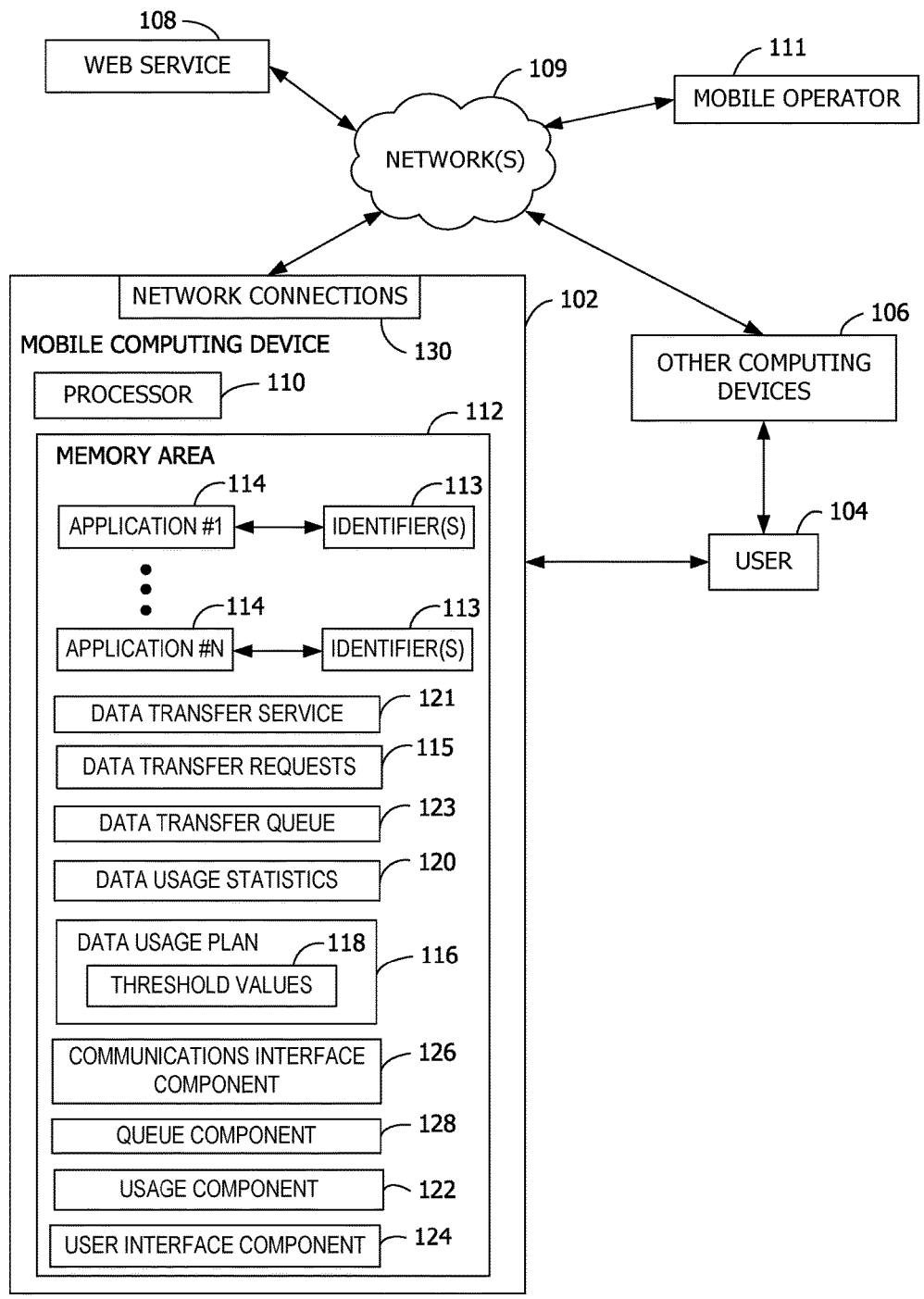
FIG. 1 is an exemplary block diagram illustrating a mobile computing device obtaining data via a network.

Referring to the figures, embodiments of the disclosure track network data usage per application 114 on a computing device by a data transfer service 121 executing on the computing device. The centralized data transfer service 121, download manager, or other background service allows the applications 114 to attribute or otherwise disambiguate data transfer request (e.g., to upload and/or download data) via identifiers 113 and to queue the attributed data transfer requests 115. For example, a web browser is able to attribute data transfer requests 115 from one web site separately from data transfer requests 115 from another web site by using a different identifier 113 separate from, or incorporated within, the application identifier.

By tagging every network communication with at least one of the identifiers 113, aspects of the disclosure enable network data usage monitoring that distinguishes among different applications 114, groups of applications 114, portions of applications 114, and/or application types. In this manner, the amount of network data being consumed by the application 114 or service on behalf of another application 114 or another service may be tracked. Further, tracking of network data consumption may continue even after termination of the originating application 114 at least because of the identifiers 113.

Referring next to FIG. 1, an exemplary block diagram illustrates a mobile computing device 102 obtaining data via a network 109. User computing devices include, for example, the mobile computing device 102 and other computing devices 106. The user computing devices communicate over one or more of the networks 109. In some embodiments, one or more of the user computing devices are associated with one of the data usage plans 116. The data usage plan 116 represents the terms and/or conditions (e.g., network data consumption allotment) under which the mobile operator 111 provides data transfer services to the user computing devices. For example, a plurality of the user computing devices may share network data consumption allotted under the same or common data usage plan 116.

The user computing devices include any device executing instructions (e.g., as application programs, operating system functionality, or both) to implement operations and functionality. The user computing devices may include, for example, the mobile computing device 102 or any other portable device. In some embodiments, the mobile computing device 102 includes a mobile telephone (e.g., mobile telephone 602 in FIG. 6), laptop, tablet, computing pad, netbook, gaming device, e-reader, and/or portable media player. The other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication to/from the user computing devices may occur using any protocol or mechanism over one or more of the networks 109. The networks 109 represent any infrastructure or other means for sending and/or receiving data. The networks 109 may include wired and/or wireless networks.

One or more of the mobile operators 111 communicate with the web service 108 and/or the user computing devices via the network 109. Further, the user computing devices communicate with the web service 108, or other entity that performs the operations described herein as being associated with the web service 108.

In some embodiments, the mobile computing device 102 and the other computing devices 106 are associated with a common data usage plan 116 of the user 104. For example, the mobile computing device 102 may represent the mobile telephone 602 of the user 104, while the other computing devices 106 may include a tablet and a laptop associated with the user 104. In other embodiments, the mobile computing device 102 and each of the other computing devices 106 are associated with separate data usage plans 116.

In some embodiments, each of the user computing devices collects data usage statistics 120 relating thereto. For example, the data transfer service 121 executing on the mobile computing device 102 generates, monitors, collects, compiles, and/or receives the data usage statistics 120 relating to network data consumption by the applications 114 executing on the mobile computing device 102. The data usage statistics 120 collected by the data transfer service 121 represent an amount of network data consumed by the mobile computing device 102 under the data usage plan 116. Alternatively or in addition, the centralized web service 108 interacts with the user computing devices and the mobile operators 111 to aggregate the data usage statistics 120. In such embodiments, the web service 108 receives a schema populated with data relating to the data usage plan 116 from the mobile operator 111 and distributes the populated schema to one or more of the user computing devices associated with the data usage plan 116.

In some embodiments, the mobile computing device 102 has at least one processor 110, a memory area 112, and at least one user interface (not shown). The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures (e.g., FIG. 2).

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102. The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114 such as application #1 through application #N. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

Each of the applications 114 has one or more identifiers 113 associated therewith. The identifiers 113 are allocated to the applications 114 on demand in some embodiments. For example, the applications 114 register at least one identifier 113, unique among the other identifiers 113, with the data transfer service 121, operating system, or other entity that tracks the network data consumption. Applications 114 may register additional identifiers 113 to increase the granularity of resource tracking (e.g., a mail program may register different identifiers 113 for different mail accounts, a browser may register different identifiers 113 for different web sites, etc.).

The identifiers 113 enable the applications 114 (e.g., containing applications) to attribute the origination of data transfer requests 115. For example, a browser application may have separate identifiers 113 for each of the web sites that originate a data transfer request 115 (e.g., Web Site A is assigned a particular identifier 113, Web Site B is assigned a particular identifier 113, etc.). The identifiers 113 correspond, for example, to one or more of the following: at least one of the applications 114, at least one application type, at least one service, and at least one service type. For example, a particular identifier 113 may correspond to a service that uses one of the applications 114 (e.g., a web site downloading data via a browser).

The mobile computing device 102 further establishes and maintains one or more network connections 130 representing communication channels or other means for sending and/or receiving data over the network 109. Exemplary network connections 130 include, but are not limited to, Wi-Fi, cellular, tethered, BLUETOOTH brand communication, near-field communication (NFC), and more. The network connections 130 may also be categorized into voice, text, data, or other categories or types of network traffic.

The memory area 112 further stores the data transfer service 121. The data transfer service 121, when executed by the processor 110, receives and processes one or more data transfer requests 115 from the applications 114. For example, and as described further below with reference to FIG. 2, the data transfer service 121 receives one of the data transfer requests 115, adds the received data transfer request 115 to a data transfer queue 123, and processes the data transfer queue 123 to initiate the queued data transfer requests 115.

The memory area 112 further stores data describing at least one data usage plan 116 associated with the user 104. In some embodiments, the memory area 112 stores a plurality of data usage plans 116. The data describing the data usage plans 116 may be received from the mobile operators 111 offering the data usage plans 116.

The data usage plan 116 may be represented by a schema (e.g., an extensible markup language schema) or other data structure. For example, the user 104 has contracted with the mobile operator 111 to receive network data transfer services from the mobile operator 111. The data usage plan 116 describes the services provided by the mobile operator 111, such as the amount of network data the user 104 can consume during a particular duration (e.g., a billing time period). For example, the data usage plan 116 describes threshold values 118 associated with the network connections 130 of one or more devices of the user 104. The threshold values 118 represent a maximum amount of network data consumption allotted under the data usage plan 116 for the network connections 130. For example, one threshold value 118 may indicate a maximum amount of network data consumption for a Wi-Fi connection, while another threshold value 118 indicates a maximum amount of network data consumption for a cellular data connection.

The schema or other data structure representing the data usage plan 116 may be defined by the web service 108, by the mobile operator 111, or by another entity. In some embodiments, each of the various data usage plans 116 subscribed to by the mobile computing device 102 and the other computing devices 106 use the same common schema. In general, the schema enables descriptions of the parts, components, services, features, or other aspects of the data usage plan 116 including, but not limited to, multi-rate data plans, peak times, roaming rates, allotted network data consumption per network connection 130, etc. In some embodiments, use of the schema allows the mobile operators 111 to send out updated portions of the schema corresponding to updated parts of a particular data usage plan 116.

In some embodiments, the schema includes a plurality of fields. Each of the threshold values 118 may be associated with one or more of the fields. For example, the fields may correspond to one or more of the following: peak times, off-peak times, peak time network data consumption quota, off-peak time network data consumption quota, peak time network data consumption remaining, off-peak time network data consumption remaining, a roaming rate, rules, a mobile operator name, a billing cycle type, a network connection type, identification of free hosts available for connection, a list of mobile hotspots, and any other elements or information pertaining to the data usage plan 116. The list of free hosts represents zero-rated or reduced cost hosts (e.g., visiting particular web sites does not count against the data usage plan 116).

The schema may also include fields supporting different billing rates per host accessed, per weekend, per night, friends and family rates, peak and off-peak rates, and more. The schema also allows each mobile operator 111 the flexibility to define complex plans including broadly offered plans, and dynamic, short-term offers to specific users 104 likely to use a specific part or parts of the overall services. Other offers based on any combination of the metrics obtained are available to the mobile operator 111.

The schema stored by the mobile computing device 102 may also include fields corresponding to the data usage statistics 120 collected, generated, or received by the mobile computing device 102 and/or the mobile operators 111. For example, to facilitate sharing the data usage statistics 120 among the mobile operators 111, web service 108, and/or user computing devices, the mobile operators 111, web service 108, and the user computing devices may populate the schema with the data usage statistics 120.

The memory area 112 further stores the data usage statistics 120 relating to one or more of the data usage plans 116. The data usage statistics 120 may be viewed as a current or instant snapshot of the amount of network data transmitted and/or received by the mobile computing device 102. For example, the mobile computing device 102 collects ongoing usage data relating to network data transfers, such as from device radios, drivers, and accelerometers of the mobile computing device 102. The data usage statistics 120 identify, to a granularity of time (e.g., per minute) or data (e.g., per kilobyte), how much data has been sent and/or received by the mobile computing device 102, the time and date of usage (e.g., start and end times), the location of usage, network interface used (e.g., over which network connections 130), roaming state, data usage plan information, the subscriber identity module (SIM) or other user identity module used for dual SIM scenarios, the international mobile station equipment identity (IMEI) or other device identifier for multi-device scenarios, the Internet protocol (IP) address or other address of the access point used for Wi-Fi scenarios, the IP address or other address of a target computer (e.g., for whitelist/blacklists in data usage), the application responsible for the data transfer, and the like. In a further example, information relating to text messages, data, voice calls, minutes used, voice over Internet Protocol (VoIP) usage, and any other element of usage consumed by, or that impacts, the mobile computing device 102 is collected to produce the data usage statistics 120. Other data usage statistics 120 are also contemplated.

The data usage statistics 120 may be collected by the mobile computing device 102, the web service 108, and/or the mobile operators 111. For example, the data usage statistics 120 may be compiled directly (e.g., by monitoring network traffic) and/or by collecting the data usage statistics 120 from other devices that perform the collection. In the example of FIG. 1, the data transfer service 121 executing on the mobile computing device 102 collects the data usage statistics 120 relating to the applications 114 executing on the mobile computing device 102.

Alternatively or in addition, the mobile computing device 102 receives updates of network data consumption by the other computing devices 106 sharing the same data usage plan 116. For example, the data usage statistics 120 may represent the network data collectively consumed by the mobile telephone 602, tablet, and laptop of the user 104. In the example of FIG. 1, the data transfer service 121 updates the data usage statistics 120 stored in the memory area 112 with the network data consumption by the other computing devices 106.

In a further example, the data transfer service 121 collects data usage statistics 120 corresponding to a plurality of data usage plans 116. In such an example, there may be a plurality of sets of data usage statistics 120 (e.g., one set for each data usage plan 116 or user 104) for the mobile computing device 102.

The memory area 112 further stores exemplary computer-executable components such as a communications interface component 126, a queue component 128, a usage component 122, and a user interface component 124. Operation of the computer-executable components, when executed, is described below with reference to FIG. 2.

Figure 2:
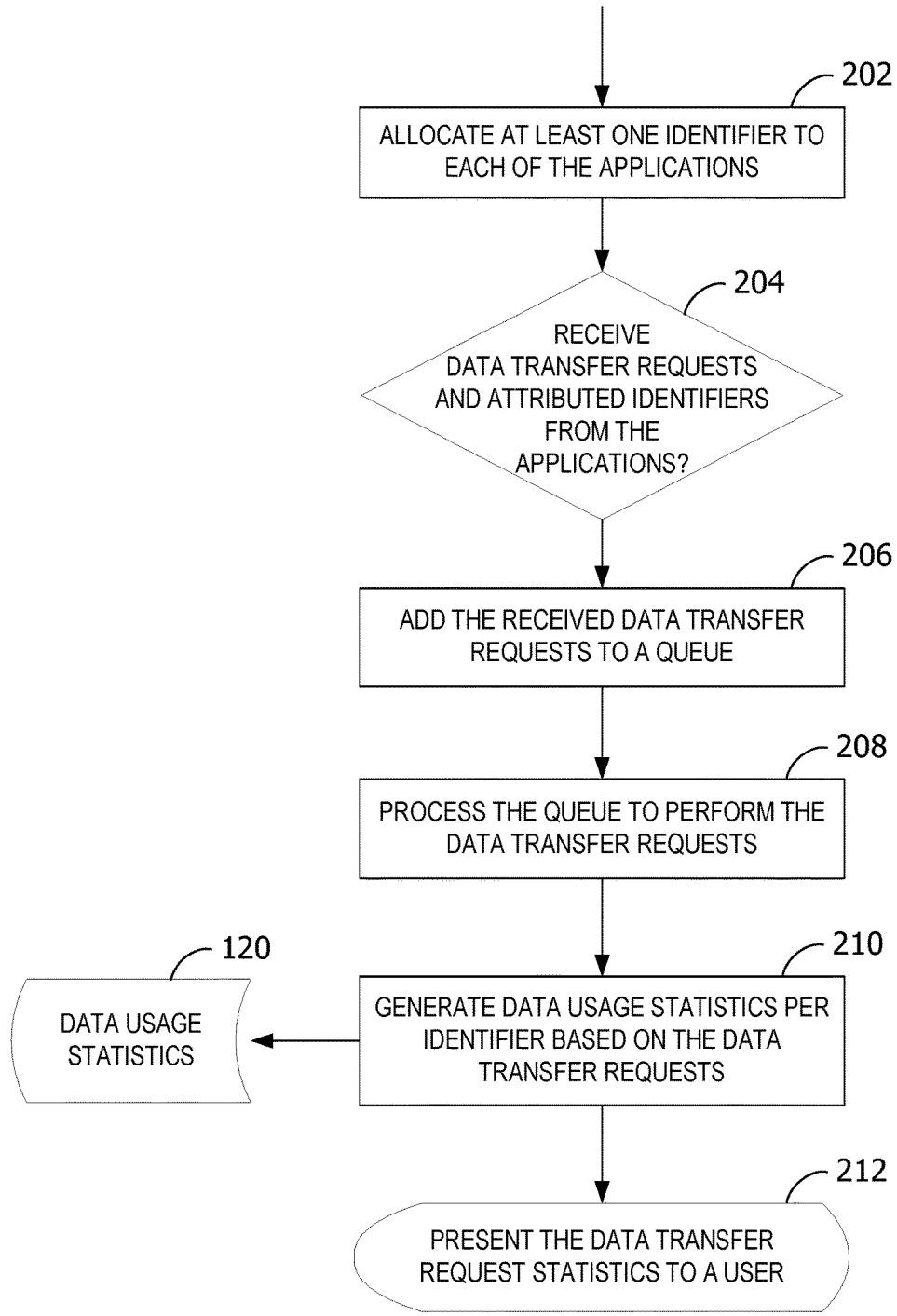
FIG. 2 is an exemplary flow chart illustrating operation of a data transfer service executing on a computing device to perform data transfer operations associated with a plurality of applications executing on the computing device.

Referring next to FIG. 2, an exemplary flow chart illustrates operation of the data transfer service 121 executing on a computing device to perform data transfer operations associated with a plurality of applications 114 executing on the computing device. The data transfer service 121 executes on the computing device to perform data transfer operations associated with the applications 114 also executing on the computing device. While the operations illustrated in FIG. 2 are described in some embodiments as being performed by the data transfer service 121 executing on the mobile computing device 102 or other computing device, the operations may be performed by any service executing on the computing device also executing the applications 114 from which the data transfer requests 115 are received. Further, the operations illustrated in FIG. 2 may be performed at an operating system level or an application program level.

At 202, the data transfer service 121 or other entity (e.g., an operating system executing on the computing device) allocates at least one of the identifiers 113 to each of the applications 114. For example, the data transfer service 121 may receive a request from one of the applications 114 to allocate a particular quantity of identifiers 113 to allocate to that application 114.

On receiving at least one of the data transfer requests 115 from at least one of the applications 114 by the data transfer service 121 at 204, the data transfer service 121 adds the received data transfer request 115 to the data transfer queue 123 or other data structure at 206. The data transfer request 115 may be stored in any way and in any form for processing by the data transfer service 121. Each received data transfer request 115 includes, or has attributed thereto, one of the identifiers 113. The included identifier 113 is associated with the application 114 that originated the data transfer request 115.

In some embodiments, the data transfer service 121 defines a data transfer request data structure. In other embodiments, another entity (e.g., an operating system executing on the computing device) defines the data transfer request data structure. The data transfer service 121 provides, or otherwise makes available, the defined data transfer request data structure to the applications 114 executing on the computing device. Each of the applications 114 populates the data transfer request data structure with at least one of the data transfer requests 115 and the identifier 113 attributed thereto or otherwise associated with origination or creation of the data transfer request 115. For example, each populated data transfer request data structure is associated with one of the data transfer requests 115. In another example, a single data transfer request data structure includes a plurality of the data transfer requests 115 each having at least one of the identifiers 113 attributed thereto.

Example implementations for associating the identifiers 113 with the data transfer requests 115 are provided in Appendix A. In particular, the identifier 113 may be added as a separate field in existing data structures, or the identifier 113 may be included within an existing field.

At 208, the data transfer service 121, or other entity executing on the mobile computing device 102, processes the data transfer queue 123 to initiate or otherwise perform the queued data transfer requests 115. At 210, the data transfer service 121 generates the data usage statistics 120 based on the performed data transfer requests 115. For example, the data usage statistics 120 are generated per identifier 113 to enable analysis of the amount of network data consumption associated with each of the identifiers 113. For example, at 212, the generated data usage statistics 120 are presented to the user 104 of the computing device for review. The presented data usage statistics 120 may be grouped by identifier 113 to enable the user 104 to identify the application 114 or subpart of the application 114 that originated the greatest amount of network data transfers. For example, the identifiers 113 are sorted in decreasing order of network data consumption corresponding thereto. In another example, the generated data usage statistics 120 are compared to the threshold values 118 of the data usage plan 116 to enable the user 104 to identify the amount of current network data consumption relative to the allotment under the data usage plan 116.

At least because the data transfer service 121 executes on the computing device to communicate with the plurality of applications 114 also executing on the computing device, the data transfer service 121 is able to maintain the attribution of the data transfer requests 115 even after the application 114 originating the data transfer requests 115 has stopped executing. For example, a browser may execute to send a data transfer request 115 to the data transfer service 121 and then terminate execution before the data transfer request 115 is fulfilled, completed, initiated, or otherwise processed by the data transfer service 121. In such an example, at least because the data transfer request 115 includes the identifier 113, the data transfer service 121 is able to identify the application 114 or subpart of the application 114 that originated the data transfer request 115.

In some embodiments, the computing device may store, or have access to, the computer-executable components stored in the memory area 112 illustrated in FIG. 1 that implement one or more of the operations illustrated in FIG. 2. For example, the communications interface component 126, when executed by the computing device, receives at least one data transfer request 115 from at least one of the applications 114. For example, the communications interface component 126 may receive a data transfer request 115 from a web browser. The received data transfer request 115 has attributed thereto an identifier 113 associated with a web site originating the data transfer request 115 through the web browser.

In some embodiments, the communications interface component 126 includes a network interface card and/or computer-executable instructions (e.g., a driver) for operating the network interface card. In some embodiments, the communications interface is operable with near-field communication (NFC) tags.

The queue component 128, when executed by the computing device, initiates the data transfer requests 115 received by the communications interface component 126. The usage component 122, when executed by the computing device, generates the data usage statistics 120 per identifier 113 based on the data transfer requests 115 initiated or otherwise performed by the queue component 128. In some embodiments, the usage component 122 groups the data transfer requests 115 received by the communications interface component 126 by type of application 114 (e.g., mail applications, video player applications, music player applications, etc.).

The user interface component 124, when executed by the computing device, presents the data usage statistics 120 generated by the usage component 122 to the user 104 of the computing device. In some embodiments, the user interface component 124 includes a graphics card for displaying data to the user 104 and for receiving data from the user 104. The user interface component 124 may also include computer-executable instructions (e.g., a driver) for operating the graphics card. Further, the user interface component 124 may include a display (e.g., a touch screen display or natural user interface) and/or computer-executable instructions (e.g., a driver) for operating the display. The user interface component 124 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the mobile computing device 102 in a particular way.

The communications interface component 126 may execute independently of the other computer-executable components (e.g., not sequentially, or without interaction or dependency on another component). For example, the communications interface component 126 may be executed by a thread separate from other thread(s) executing the queue component 128, the usage component 122, and/or the user interface component 124.

Figure 3:
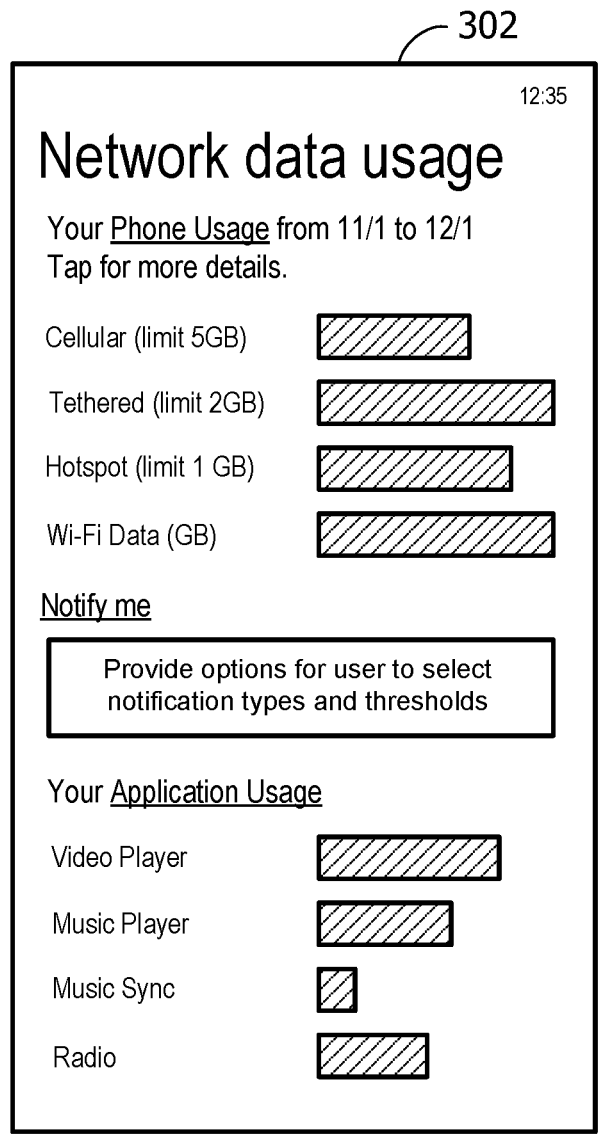
FIG. 3 is an exemplary user interface illustrating network data usage by different types of network connections and by application.

Referring next to FIG. 3, an exemplary user interface 302 illustrates network data usage by different types of network connections 130 and by application 114. While the proportions of the user interfaces 302, 402, 502, 504, 506 illustrated in FIG. 3, FIG. 4, FIG. 5A, FIG. 5B, and FIG. 5C are shown to conform to a screen of the mobile computing device 102 (e.g., the mobile telephone 602), the content displayed within the user interfaces 302, 402, 502, 504, 506 may be shown in any format on any of the user computing devices.

In FIG. 3, data usage for a plurality of the network connections 130 is shown to the user 104 in the user interface 302. In particular, data usage statistics 120 attributed to each of the exemplary network connections 130 is shown. For example, the amounts of data transmitted and/or received over a cellular network connection, a tethered network connection, a Hotspot network connection, and a Wi-Fi network connection are shown. The amounts of data are represented by horizontal bars sized proportionally to the corresponding amounts of data transmitted and/or received.

The user interface 302 also displays the threshold values 118 associated with each of the network connections 130. The threshold values 118 are taken from the data usage plan 116. For example, the data usage plan 116 indicates that the user 104 has a maximum of 5 gigabytes (GB) of data usage available for the cellular network connection, 2 GB of data usage for the tethered network connection, 1 GB of data usage for the Hotspot network connection, and an unlimited amount of data usage for the Wi-Fi network connection.

The user interface 302 in FIG. 3 may also display a button or bar that, when selected by the user 104 (e.g., clicked or touched), the user interface 302 allows the user 104 to select options or other configuration settings for receiving notifications. The notifications are sent when the amounts of data transmitted and/or received over the various network connections 130 reaches particular values (e.g., set by the user 104, mobile computing device 102, mobile operator 111, or other entity).

In the bottom portion of the user interface 302, the data usage statistics 120 are shown per application 114. For example, the amount of network data consumed by each of a video player, a music player, a music synchronization application, and a radio application is shown. The amounts of network data consumed are represented by horizontal bars sized proportionally to the corresponding amounts of data transmitted and/or received.

Figure 4:
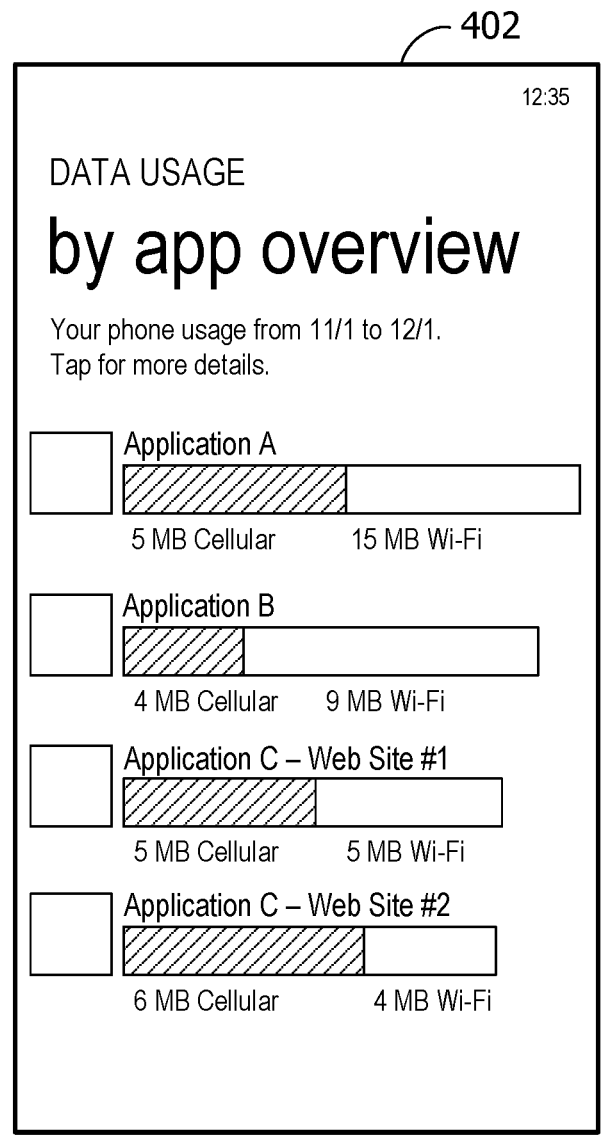
FIG. 4 is an exemplary user interface illustrating network data usage per application and identifiers associated with the applications.

Referring next to FIG. 4, an exemplary user interface 402 illustrates network data usage per application 114 and identifiers 113 associated with the applications 114. In the example of FIG. 4, the user interface 402 displays network data consumption over cellular and Wi-Fi networks for each of four applications 114 executing on the mobile computing device 102: Application A has consumed 5 megabytes (MB) of cellular data and 15 MB of Wi-Fi data, Application B has consumed 4 MB of cellular data and 9 MB of Wi-Fi data, Application C—Web Site #1 has consumed 5 MB of cellular data and 5 MB of Wi-Fi data, and Application C—Web Site #2 has consumed 6 MB of cellular data and 4 MB of Wi-Fi data. While the user interface 402 in FIG. 4 illustrates only cellular and Wi-Fi data consumption, the network data used over other networks 109 may be displayed alternatively or in addition. Further, the applications 114 may be ranked in order of total bandwidth consumption (e.g., total network data consumption) or consumption by network or connection type (e.g., cellular, Wi-Fi, etc.).

In the example of FIG. 4, Application C (e.g., a browser) has at least two identifiers 113 allocated thereto: an identifier for Web Site #1 and an identifier for Web Site #2. In this manner, rather than merely viewing an aggregate amount of network data consumed by Application C, the user 104 is able to view the amount of network data consumed on behalf of each web site displayed through Application C.

In some embodiments (not shown), the user interface 402 may show consumption of resources other than network data, such as power and/or memory consumption by each of the applications 114.

Figures 5A, 5B, 5C:
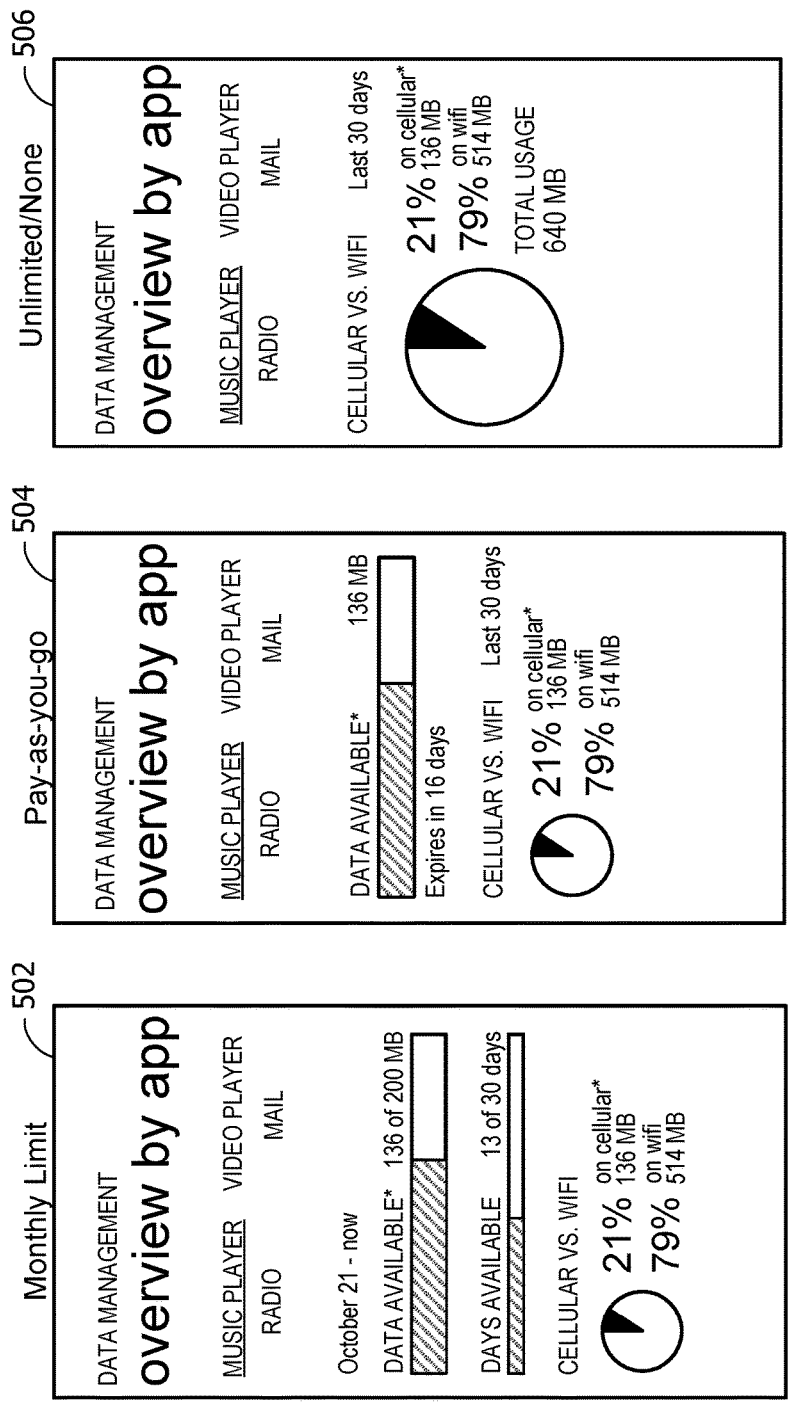
FIG. 5A is an exemplary user interface illustrating network data usage per application under a data usage plan with a monthly limit.
FIG. 5B is an exemplary user interface illustrating network data usage per application under a pay-as-you-go data usage plan.
FIG. 5C is an exemplary user interface illustrating network data usage per application under a data usage plan with unlimited data usage.

Referring next to FIG. 5A, an exemplary user interface 502 illustrates network data usage per application 114 under the data usage plan 116 with a monthly limit. The user interface 502 displays a set of the applications 114 executing on the mobile computing device 102 (e.g., the applications 114 consuming the greatest amount of network data, the applications 114 frequently or recently selected by the user 104 for execution, etc.). In the example of FIG. 5A, the set of applications 114 includes a music player, a video player, a radio application, and a mail application. The term "music player" is underlined in FIG. 5A, indicating that the user 104 has chosen to view the data usage statistics 120 associated with the music player application. Clicking on the other applications 114 displays the data usage statistics 120 associated with the other applications 114.

While the overviews of data usage illustrated in FIG. 5A, FIG. 5B, and FIG. 5C indicate that the data usage statistics 120 shown are per application 114, the user interfaces 502, 504, 506 may alternatively or in addition display an overview of aggregated data usage across the applications 114 on the mobile computing device 102. Further, the user interfaces 502, 504, 506 may alternatively or in addition display an overview of data usage per computing device of the user 104 or aggregated across a plurality of the computing devices of the user 104. For example, the different statistics may be shown in different tabs or tiles in the user interfaces 502, 504, 506. In an example involving a family or shared data plan, the statistics for each plan member may be shown in separate tiles.

Further, in addition to overall cellular data usage and overall Wi-Fi data usage, aspects of the disclosure may show subsets of the data usage generally corresponding to various tariff levels. For example, for the cellular data usage, the data usage at each of the following tariff levels may be shown: local, roaming, and/or international. As another example, for the wireless local area network, the data usage at each of the following tariff levels may be shown: hotspot, remote, paid, and/or free.

In FIG. 5A, the data usage statistics 120 include the amount of network data remaining for use (e.g., the remainder of the monthly limit specified by the data usage plan 116), the amount of network data used during the current billing period, and the quantity of time (e.g., days) remaining within the current billing period. The data usage statistics 120 also indicate a breakout of the data usage, such as the amount of data consumed under a cellular network connection versus the amount of data consumed under a Wi-Fi network connection.

Referring next to FIG. 5B, an exemplary user interface 504 illustrates network data usage per application 114 under a pay-as-you-go data usage plan 116. In FIG. 5B, the data usage statistics 120 include the amount of network data consumption remaining for use (e.g., the remainder of the pay-as-you-go amount specified by the data usage plan 116), the amount of network data consumed recently (e.g., within the last 30 days), and the quantity of time (e.g., days) remaining. For example, the remaining network data consumption expires in 16 days. The data usage statistics 120 also indicate a breakout of the data usage, such as the amount of data consumed under a cellular network connection versus the amount of data consumed under a Wi-Fi network connection.

Referring next to FIG. 5C, an exemplary user interface 506 illustrates network data usage per application 114 under the data usage plan 116 with unlimited data usage. In FIG. 5C, the data usage statistics 120 include the amount of network data consumed recently (e.g., within the last 30 days). The data usage statistics 120 also indicate a breakout of the data usage, such as the amount of data consumed under a cellular network connection versus the amount of data consumed under a Wi-Fi network connection. The data usage statistics 120 also indicate a total amount of usage by the mobile computing device 102.

The usage component 122, data transfer service 121, or other component or module provides a set of application programming interfaces (APIs) to correlate the identifier 113 associated with a particular data transfer request 115 to the application 114 that originated the data transfer request 115. For example, from an example identifier 113 of "$3^{rd}$ Party App:Game 1", aspects of the disclosure map this example identifier 113 to the actual application name, localized text, icons, etc. for display purposes, such as in the user interfaces 502, 504, 506.

The user interfaces 502, 504, and 506 enable the user 104 to instantly view and interpret the amount of network data being consumed by particular applications 114 or groups of applications 114. For example, when the user 104 views the network data consumption for the video player application, the user 104 may conclude that the video player application consumes much of the network data usage allotted under the data usage plan 116. The user 104 may then decide to watch fewer videos to preserve some network data consumption for the end of the billing cycle, and to stop worrying about excess data fees.

From the user interfaces 502, 504, 506 or elsewhere during the interaction between the user 104 and the mobile telephone 602, the user 104 is able to pin any of the applications 114 to a start or home screen of the mobile telephone 602 to view the network data usage information in real-time from the start screen.

In some embodiments, the data usage statistics 120 include an average of the network data consumption per time of day, for each of the applications 114. The user interfaces 502, 504, 506 may display such an average, alternatively or in addition to other data usage statistics 120.

Figure 6:
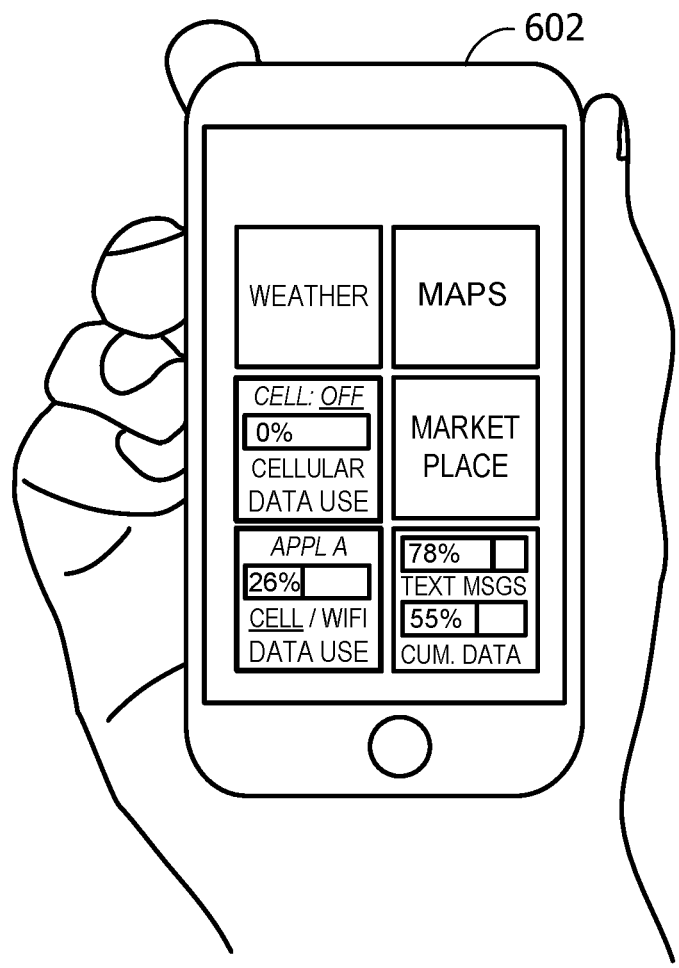
FIG. 6 is an exemplary block diagram illustrating a mobile computing device having a tile for displaying network data usage statistics to a user.

Referring next to FIG. 6, an exemplary block diagram illustrates the mobile computing device 102 having tiles for displaying network data usage statistics 120 to the user 104. The mobile telephone 602 displays a plurality of tiles (e.g., active tiles) that may be updated with the data usage statistics 120. In some embodiments, tiles represent tile user interface elements. In one of the tiles in the example of FIG. 6, the mobile telephone 602 indicates that 78% of the allotment for text messages has been consumed, while 55% of the allotment for data usage has been consumed.

In another tile, the data usage statistics 120 associated with a particular application 114 and the cellular network connection are displayed. In the example of FIG. 6, 26% of the allotment for cellular data transmissions by Application A has been consumed.

In another tile, the real-time or instant usage of cellular network data by any of the applications 114 is shown. In the example of FIG. 6, the tile indicates that 0% of the allotment is currently being used (e.g., cellular connectivity is disabled). The user 104 may find this tile useful when the user 104 is worried that the mobile telephone 602 might connect to a cellular network and incur data charges. The pinned tile enables the user 104 to confirm in real-time that the no such data use is occurring.

Additional Examples

In some embodiments, the applications 114 may define timers and/or events to start and stop attribution of the data transfer requests 115. For example, a particular application 114 may attribute data transfer requests 115 during peak times but not off-peak times because the data usage plan 116 includes free off-peak data transfers.

Some embodiments contemplate separate broker services executing on the mobile computing device 102 for uploading and downloading data to/from the mobile computing device 102. For example, a communication service downloads feeds/emails from different user accounts (e.g., social networking, mail, etc.). A background download service receives requests from different applications 114 and schedules the downloads. Both the communication service and the background download service attribute network data usage to the requesting applications 114 even though these broker services actually execute the network data transfer.

The identifier 113 may be tagged on a per-socket basis. In such embodiments, network traffic that occurs between the initial connection of the socket and final closure of the socket is exclusively attributed to an identifier associated with that socket. If the application 114 uses more than one socket, the network activities in that application 114 are separately attributed to each socket.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for enabling attribution of the data transfer requests 115 by the plurality of applications 114 in communication with the data transfer service 121 executing on the mobile computing device 102.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

In some embodiments, a subProcessTag is overloaded to implement network data usage attribution as described herein. For example, the subProcessTag is used to attribute network data usage to individual services running within the same service host process. In operation, the subProcessTag on the current thread is temporarily overwritten by a custom tag right before establishing one of the network connections 130. The original value of the subProcessTag may be restored once the connection has been made.

Aspects of the disclosure map application data (e.g., product identifier, name, icon, etc.) to the identifier 113 for association with the data transfer request 115. For example, when the data transfer service 121 retrieves feeds from a social networking account, the data transfer service 121 performs the following exemplary operations:

```
ULONG originalTagValue =
SetCustomValueOnSubProcessTag(Comms.SocialNetworkingWebSite);
  HttpRequest.Open(...);
  RestoreOriginalValueOnSubProcessTag(originalTagValue);
  HttpRequest.Send(...);
```

The subProcessTag is further propagated between threads executing on the mobile computing device 102, in some embodiments, to enable support for asynchronous operation.

In another example, the network data attribution identifier 113 may be included in a three-tuple or triplet as (ProcessIdentifier, ApplicationIdentifier, NetworkDataAttributionIdentifier). The NetworkDataAttributionIdentifier represents a custom tag identifying the application, or portion or entity associated therewith, that originates the data transfer request 115.

In still another example, the ApplicationIdentifier tag in the two-tuple (ProcessIdentifier, ApplicationIdentifier) is modified to be ApplicationIdentifier:NetworkDataAttributionIdentifier, thus including the application identifier and the network data attribution identifier 113.

What is claimed is:

1. A method comprising:
monitoring active network interfaces to track data usage of a plurality of applications executing on a mobile computer, wherein each of the plurality of applications is associated with one or more identifiers including a unique identifier;
generating data usage statistics per unique identifier of an application of a subset of the plurality of applications, based on data transfers performed by the mobile computer based on data transfer requests from the application of the subset of the plurality of applications executing on the mobile computer, wherein each data transfer request includes information about a unique identification of a particular application that originated the data transfer request, wherein the unique identifier is different from a network identifier associated with a network connection; and
displaying the generated data usage statistics per unique identifier of each application of the subset of the plurality of applications.

2. The method of claim 1, wherein the generated data usage statistics provide network data consumed for each application of the subset of the plurality of applications.

3. The method of claim 1, wherein the generated data usage statistics identify which network interface is being used for data usage.

4. The method of claim 1, wherein displaying the generated data usage statistics comprises sorting the generated data usage statistics application in decreasing order of network data consumption.

5. The method of claim 1, further comprising receiving a request from the application of the subset of the plurality of applications to register the unique identifier with a service that tracks data consumption.

6. The method of claim 1, further comprising:
receiving data transfer requests from one or more of the plurality of applications;
identifying a unique identifier associated with each of the data transfer requests; and
identifying the one or more applications based on the identified unique identifiers.

7. The method of claim 6, further comprising:
adding the received data transfer requests to a queue; and processing the queue to initiate the data transfer requests.

8. A system for tracking network data usage for a plurality of applications executing on a mobile computing device, the system comprising:
a memory area associated with the mobile computing device, the memory area storing the plurality of applications; and
a processor programmed to:
monitor active network interfaces to track data usage of the plurality of applications, wherein each of the plurality of applications is associated with one or more identifiers including a unique identifier;
generate data usage statistics per unique identifier of an application of a subset of the plurality of applications, based on data transfers performed by the mobile computing device based on data transfer requests from the application of the subset of the plurality of applications executing on the mobile computing device, wherein each data transfer request includes information about a unique identification of a particular application that originated the data transfer request, wherein the unique identifier is different from a network identifier associated with a network connection; and display the generated data usage statistics per unique identifier of each application of the subset of the plurality of applications.

9. The system of claim 8, wherein the generated data usage statistics represent network data consumed for each application of the subset of the plurality of applications.

10. The system of claim 8, wherein the generated data usage statistics identify which network interface is being used for data usage.

11. The system of claim 8, wherein displaying the generated data usage statistics comprises sorting the generated data usage statistics application identifier in decreasing order of network data consumption.

12. The system of claim 8, wherein the processor is further programmed to receive a request from the application of the subset of the plurality of applications to register the unique identifier with a service that tracks data consumption.

13. The system of claim 8, wherein the processor is further programmed to:
receive data transfer requests from one or more of the plurality of applications;
identify a unique identifier associated with each of the data transfer requests; and
identify the one or more applications based on the identified unique identifiers.

14. The system of claim 13, wherein the processor is further programmed to:
add the received data transfer requests to a queue; and
process the queue to initiate the data transfer requests.

15. One or more computer-readable storage devices comprising computer-executable instructions, that when executed by one or more processors, cause the one or more processors to:
monitor active network interfaces to track data usage of a plurality of applications executed on a mobile computing device, wherein each of the plurality of applications is associated with one or more identifiers including a unique identifier;
generate data usage statistics per unique identifier of an application of a subset of the plurality of applications, based on data transfers performed by the mobile computing device based on data transfer requests from the application of the subset of the plurality of applications executing on the mobile computing device, the performed data transfer requests being processed at the mobile computing device, wherein each data transfer request includes information about a unique identification of a particular application that originated the data transfer request, wherein the unique identifier is different from a network identifier associated with a network connection; and
displaying the generated data usage statistics per unique identifier of each application of the subset of the plurality of applications.

16. The one or more computer-readable storage devices of claim 15, wherein the generated data usage statistics represent network data consumed for each application of the subset of the plurality of applications.

17. The one or more computer-readable storage devices of claim 15, wherein the generated data usage statistics identify which network is being used for data usage.

18. The one or more computer-readable storage devices of claim 15, wherein displaying the generated data usage statistics comprises sorting the generated data usage statistics per application in decreasing order of network data consumption.

19. The one or more computer-readable storage devices of claim 15, wherein the computer-executable instructions further cause the one or more processors to receive a request from the application of the subset of the plurality of applications to register the unique identifier with a service that tracks data consumption.

20. The one or more computer-readable storage devices of claim 15, wherein the computer-executable instructions further cause the one or more processors to:
receive data transfer requests from one or more of the plurality of applications;
identify a unique identifier associated with each of the data transfer requests;
identify the one or more applications based on the identified unique identifiers;
add the received data transfer requests to a queue; and
process the queue to initiate the data transfer requests.

* * * * *